Sept. 6, 1960  F. W. OLLAND  2,951,727
WEIGHING MACHINE
Filed April 15, 1958

INVENTOR
FREDERIK W. OLLAND,
BY
ATTORNEY

United States Patent Office 2,951,727
Patented Sept. 6, 1960

2,951,727
WEIGHING MACHINE

Frederik W. Olland, Bilthoven, Netherlands, assignor to N.V. Snelwegerfabriek Olland, De Bilt, Netherlands, a corporation of the Kingdom of the Netherlands Filed Apr. 15, 1958, Ser. No. 728,709

Claims priority, application Netherlands May 14, 1957

1 Claim. (Cl. 308—2)

In weighing machines it is common practice to lock the knife-edges of the levers in such a way relative to their bearings that they cannot shift in the axial direction or only to a very small extent.

For this purpose use is made of so-called locking or buffer plates, which are fastened to the component containing the bearings in which the knife-edges are supported.

Sometimes it is customary to fix these buffer plates elastically relative to the direction of the line of the knife-edges. The ends of the knife-edges with which the buffer plates cooperate are slightly bevelled, so that the buffer plates touch the knife-edges only in one point, which is situated on the pivoting axis, so that additional friction is avoided. If owing to shocks or impacts the lever shifts laterally, the elastic buffer plates see to it that the stress on the knife-edge tips is reduced and at the same time that the lever in which the knife-edges are fitted returns to the correct position.

With a view to elastically fixing the buffer plates, hitherto two screws used to be employed, each of which is fitted with a spiral spring for elastically forcing the buffer plate against the bearing holder. Sometimes a single screw fitted with a spiral spring was employed, but in this case the buffer plate had to be prevented in a suitable way from pivoting about said screw.

The invention has for its object to provide a particularly simple and cheap device for elastically fixing such buffer plates to the bearing holders of a weighing machine, without making use of screw connections. According to the invention each of the buffer plates is fastened by means of an approximately W-shaped leaf or wire spring, the central part of which rests against the plate, and the two outer limbs of which each extend through an opening in the plate and through an opening in the bearing holder, and are retained therein owing to the fact that their ends, which have been turned back towards each other, have snapped over the edges of the respective openings under the influence of a tension in the spring, which tends to bias the outer limbs toward each other.

Advantages presented by this construction consist in that the tapping of screw thread in the bearing holder becomes superfluous, that no additional means are necessary to prevent the pivoting of the plate, that a small constructional length is possible, and that the spring can be fitted in a particularly simple and rapid way and will hold itself more tightly as the load increases.

The invention is to be elucidated further with reference to the drawing, which illustrates an embodiment of the device according to the invention.

Figure 1:
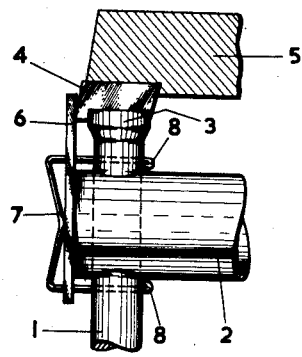
Figure 1 is a top view of one of the knife-edge bearings of a weighing machine.
Figure 2:
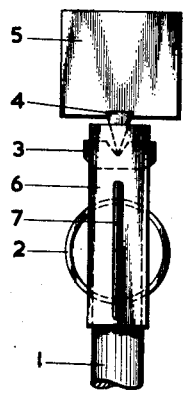
Figure 2 is a side elevation of the knife-edge bearing according to Figure 1.

The bearing holder shown in the drawing consists of longitudinal tubes 1 and transverse tubes 2. The longitudinal tubes are fitted at their ends with pans 3, which cooperate with knife-edges 4 of a lever 5 of the weighing machine. A buffer plate 6 is forced against the end of the transverse tube 2 by a wire spring 7, which is approximately W-shaped. The central part of the spring 7 rests against the plate 6 and each of the two outer limbs of said spring extends through an opening in the plate 6 and an opening in the longitudinal tube 1 of the bearing holder. The ends 8 of said limbs have been turned back towards each other.

When the plate 6 is fitted, the spring 7 is pushed with its turned-back ends 8 through the two openings of the plate 6 and is subsequently stuck through the openings in the longitudinal tube 1 of the bearing holder. As soon as the spring 7 has reached the correct position for elastically forcing the plate 6 against the end of tube 2, the turned-back ends 8 snap over the edges of the openings in the tube 1, under the influence of a bias tension in the spring, which tends to urge these ends toward each other. The spring thus keeps itself in the correct position. If under the influence of a shock or impact the lever 5 with the knife-edge 4 shifts in the lateral direction relative to the bearing holder, the buffer plate 6 is lifted slightly off the tube 2 by the knife-edge 4 against the pressure of the central part of the spring 7. The spring 7 will then force back the buffer plate 6 and will thus return the lever 5 to its original position. When the buffer plate 6 is moved outwards by the knife-edge 4, the central part of the spring 7 will be straightened slightly, as a result of which the tendency to bias the two outer limbs toward each other will become greater. The turned-back ends 8 will therefore engage behind the edges of their openings with greater force as the spring 7 is loaded more heavily by the plate 6. Instead of the wire spring 7 shown in the drawing, a leaf spring may also be used.

What I claim is:

A weighing machine comprising a lever having a knife-edge, a bearing holder having a bearing at its upper end engaging said knife-edge, a buffer plate beside said bearing holder and having an end extending beyond said bearing and abutting an extremity of said knife-edge, and a generally W-shaped spring having its outer legs passing through aligned openings in said buffer plate and said bearing holder in succession, said outer legs being resiliently biased toward each other and having their free ends bent back towards each other and snapped behind the edge of the respective bearing holder openings by influence of the leg bias, the central part of said spring engaging said buffer plate and resiliently biasing it against said bearing holder, whereby said extending end of said buffer plate elastically fixes said knife-edge in its axial direction with respect to said bearing.

References Cited in the file of this patent

UNITED STATES PATENTS

| 1,792,942 | Taylor | Feb. 17, 1931 |
| 1,963,101 | Sawtelle | June 19, 1934 |

FOREIGN PATENTS

| 302,633 | Great Britain | Dec. 19, 1928 |
| 516,718 | Germany | Jan 27, 1931 |